8460X
J. BROWN.
Thrashing Machine.
Patented Oct. 21, 1834.
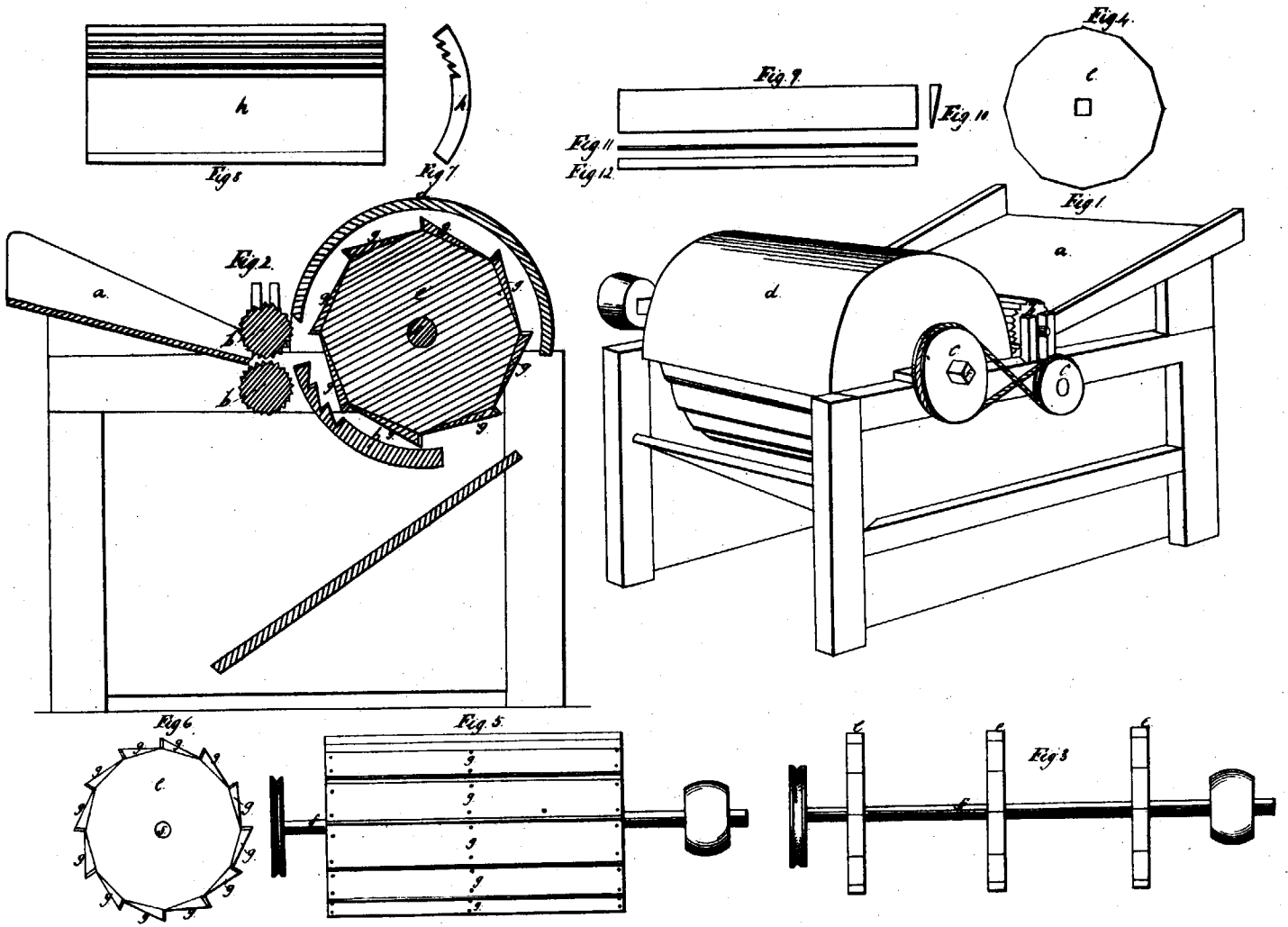
N. PETERS. Photo-Lithographer, Washington, D. C.

John Brown of Jackson, Tenn:
Letters Patent

The schedule referred to in these Letters Patent and making part of the same containing a description in the words of the said John Brown himself, of his improvement in a machine for thrashing grain –

---

To all to whom these presents shall come: Be it known that I John Brown of Jackson in the County of Madison and State of Tennessee, have invented a new and useful improvement in a machine for thrashing grain, and that the following is a full and exact description of the construction and operation of the said machine as invented or improved by me.

The machine like those in ordinary use consists of a supporting frame, feed trough feeding rollers, bands, whirls concave, cylinder cap or cover and cylinder. The latter alone being peculiar in its construction and is made as follows. Three or more polygonal wooden heads equal in diameter to that of the intended cylinder with any number of sides say 12 are firmly secured to an iron shaft of proper dimensions passing through their centres, so as to stand at equal distances apart the distance between the two outside ones being equal to the length of the intended cylinder – Twelve or more strikers or beaters are secured to the heads, formed of strips or bars of hard wood, say, of ash equal in length to the cylinder, their breadth correspon-ding to the side of the polygon, and their thickness at one edge being one third their breadth, whilst at the other it may be of a thickness only sufficient to form a close joint with the adjoining beater, or in other words their external surfaces lay in a bevelling position to the sides of the polygon the external profile presenting the appearance of saw teeth and the internal the sides of the polygonal heads. –

Each bar may be secured by two screws to each head, so as to be firm and solid – The front or highest edges of the bars or beaters are faced with strap iron or such as is used for hooping casks, the outer edge of each strap coinciding neatly with the outer or acute corner of the beater which may be best effected by filing the iron down to it, after it is secured thereto by a sufficient number of screws. –

The concave which I prefer using is made of a single piece of timber which extends around the cylinder 1/4 of its circumference. the upper third part of its surface is formed precisely like that of the cylinder except that the order is reversed, and the ironed edges are only about 1/6 the distance apart, the remaining or lower 2/3 being left plain —

Operation. The grain to be thrashed is placed on the feeding floor, and the machine being set in revolution, the grain is taken in between the cylinder & concave, and the front edges of the beaters operating in conjunction with the concave, thrash off the grain which together with the straw falls on the inclined plane below the cylinder and is discharged. The dimensions of the cylinder which I have used and consider best is 30 inches diameter & 4 feet long - the bevelled surface of the bars 7½ inches; the front edge two inches — Now what I claim as my improvement and for which I ask a patent is the construction of the cylinder and facing the front edges of the beaters with strap iron as above described —

In testimony that the foregoing is a true specification of my said improvement, I have hereunto set my hand at the City of Washington this 21st day of October 1834 —

Witnesses
Robt. Clarke
Rich. W. Clarke

John Brown

[672 [illegible]

Drawing